(12) United States Patent
Nacsa et al.

(10) Patent No.: US 12,254,679 B2
(45) Date of Patent: Mar. 18, 2025

(54) SYSTEMS AND METHODS FOR GENERATING THREE-DIMENSIONAL ANNOTATIONS FOR TRAINING A MACHINE LEARNING MODEL

(71) Applicant: Verizon Patent and Licensing Inc., Basking Ridge, NJ (US)

(72) Inventors: Gellert Nacsa, Nagykovácsi (HU); Domonkos Huszar, Kistarcsa (HU); Felician Benda, Budapest (HU); Akos Kiss, Budapest (HU); Istvan S. Horvath, Budapest (HU); Gabor Majoros, Tokaji utca (HU); Csaba Rekeczky, Monte Sereno, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 495 days.

(21) Appl. No.: 17/653,213

(22) Filed: Mar. 2, 2022

(65) Prior Publication Data
US 2023/0281975 A1  Sep. 7, 2023

(51) Int. Cl.
*G06T 7/00* (2017.01)
*G06T 7/70* (2017.01)
*G06T 7/80* (2017.01)
*G06V 10/24* (2022.01)
*G06V 10/26* (2022.01)
*G06V 10/776* (2022.01)

(52) U.S. Cl.
CPC .............. *G06V 10/776* (2022.01); *G06T 7/80* (2017.01); *G06V 10/248* (2022.01); *G06V 10/26* (2022.01); *G06T 2207/10012* (2013.01); *G06T 2207/20081* (2013.01); *G06T 2207/20084* (2013.01)

(58) Field of Classification Search
USPC .............. 382/103–105, 151–157; 706/1–62, 706/900–903
See application file for complete search history.

(56) References Cited

U.S. PATENT DOCUMENTS

| | | |
|---|---|---|
| 10,911,747 B1* | 2/2021 | Kiss .................... H04N 23/661 |
| 11,151,744 B1* | 10/2021 | Konolige .......... G06V 30/19173 |
| 2018/0137892 A1* | 5/2018 | Ding ..................... G11B 27/031 |

(Continued)

OTHER PUBLICATIONS

Eder Marc; Systems and Methods for Building a Virtual Representation of a Location; 2021 (Year: 2021).*

(Continued)

*Primary Examiner* — Marcellus J Augustin

(57) ABSTRACT

A device may receive a video and corresponding camera information associated with a camera that captured the video, and may select an object in the video and a wire model for the object. The device may adjust an orientation, location, or size of the wire model to align the wire model on the object in a frame of the video, based on the corresponding camera information and to generate an adjusted wire model. The device may identify the object in another frame of the video, and may align the adjusted wire model on the object in the other frame. The device may interpolate the adjusted wire model for the object for intermediate frames of the video between the first and other frames, and may generate three-dimensional annotations for the video based on the adjusted wire models. The device may train a machine learning model based on the three-dimensional annotations.

20 Claims, 11 Drawing Sheets

(56) References Cited

U.S. PATENT DOCUMENTS

2019/0347806 A1* 11/2019 Vajapey ............... G06T 7/20
2020/0126299 A1*  4/2020 Bosch ................. G06T 13/20
2022/0319024 A1* 10/2022 Westmacott .......... G01C 21/30

OTHER PUBLICATIONS

Trucco et al., "Introductory Techniques for 3-D Computer Vision," Prentice-Hall, 1998, 212 Pages.
Cyganek et al., "An Introduction to 3D Computer Vision Techniques and Algorithms," Wiley, 2009, 502 Pages.
Li et al., "3-D Object Recognition Using 2-D Views," IEEE Transactions on Image Processing, vol. 17, No. 11, Nov. 2008, 20 Pages.
Suliman et al., "Single Camera Calibration in 3D Vision," the Annals of "Dunarea De Jos" University of Galati Fascicle III, 2009, vol. 32, No. 2, ISSN 1221-454X, Electrotechnics, Electronics, Automatic Control, Informatics, 4 Pages.
Yang et al., "CubeSLAM: Monocular 3D Object SLAM," EEE Transactions on Robotics, 2018, 14 Pages.

\* cited by examiner

SYSTEMS AND METHODS FOR GENERATING THREE-DIMENSIONAL ANNOTATIONS FOR TRAINING A MACHINE LEARNING MODEL

BACKGROUND

Machine learning models in the field of computer vision are used to improve the ability of computer vision systems to detect information in video data (e.g., objects). Machine learning models often require "training" to improve their operation. Training typically involves providing a set of data representative of the kind of data that the machine learning model is expected to process, so that the model can "learn" how to recognize information in the data. Training can be done in a "supervised learning" manner, where humans interact with the model to give feedback on whether the model has correctly recognized the information, thereby allowing the model to adjust its recognition algorithm.

DETAILED DESCRIPTION OF EXAMPLE EMBODIMENTS

Figure 1A:
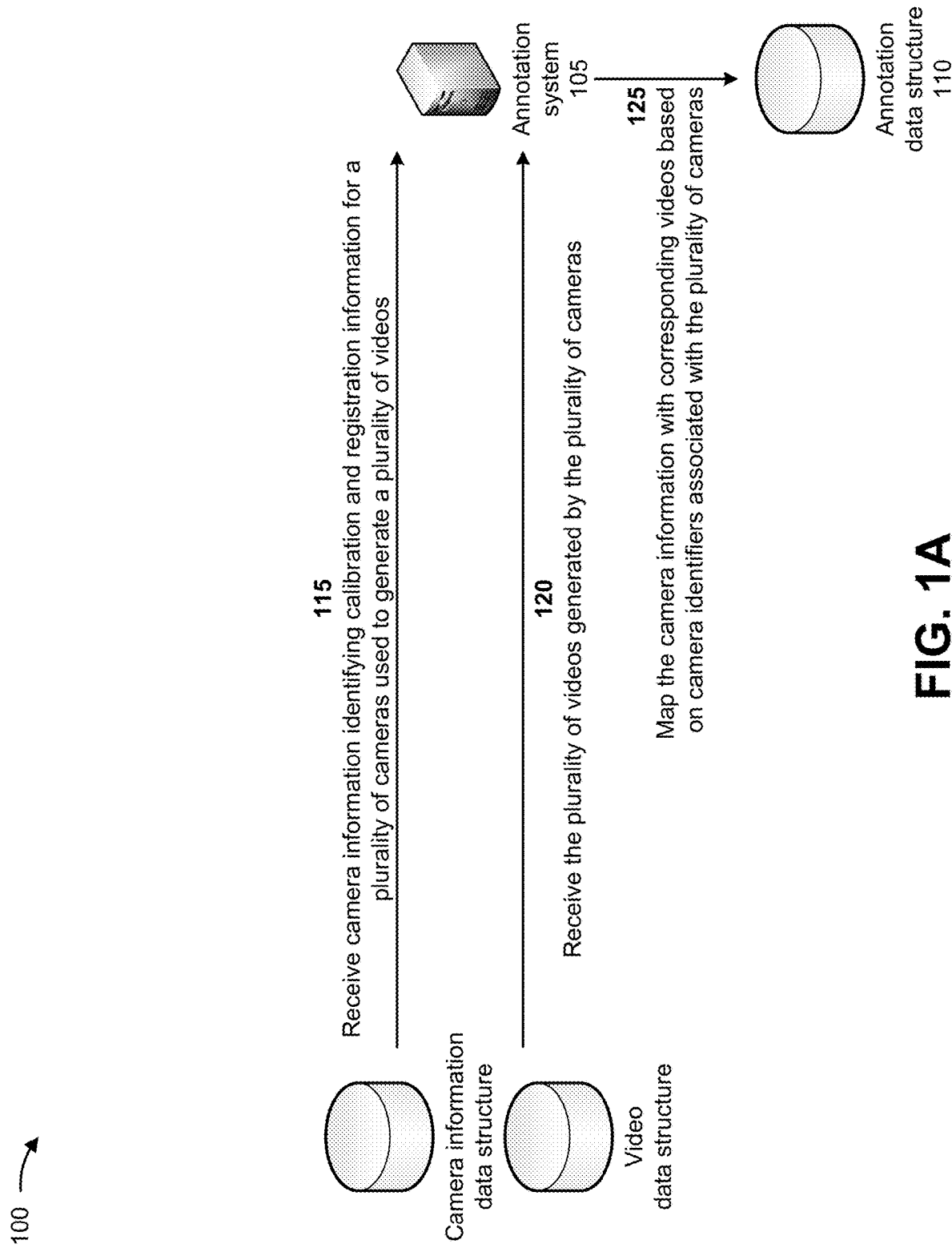
FIGS. 1A-1H are diagrams of an example associated with generating three-dimensional annotations for training a machine learning model.

The following detailed description of example implementations refers to the accompanying drawings. The same reference numbers in different drawings may identify the same or similar elements.

Utilizing machine learning models for computer vision applications requires large quantities of data for training, testing, and validating the machine learning models in order to obtain levels of recognition accuracy that are acceptable. Machine learning models may achieve higher accuracy if high-quality annotation data is used as part of a supervised learning process for training the machine learning models. Annotation involves marking and labeling objects appearing in images and videos used to do the training. In most cases, such annotation data is manually generated by humans due to unavailability of adequate tools to automate the process. As an example, there is a lack of tooling to do automated annotation of three-dimensional (3D) objects in captured video data that is inherently two-dimensional (2D). This slow and expensive manual process creates a bottleneck for developing and testing machine learning models, such as deep learning models. For example, manual annotation can slow the speed at which models can be deployed to perform computer vision applications, and manual annotators can introduce errors in the annotation data (human error). Thus, current techniques for generating annotation data for machine learning models are inefficient in their use of resources such as computing resources (e.g., processing resources, memory resources, communication resources, and/or the like), networking resources, human resources and/or other resources, and can be associated with generating poor-quality annotation data, generating insufficient machine learning models based on the poor-quality annotation data, incorrect predictions generated by the insufficient machine learning models, and/or the like.

Some implementations described herein provide an annotation system that generates three-dimensional annotations for training a machine learning model. For example, the annotation system may receive a video and corresponding camera information associated with a camera that captured the video, and may select an object in the video and a wire model for the object. The annotation system may adjust one or more of an orientation, a location, or a size of the wire model to align the wire model on the object in a frame of the video, based on the corresponding camera information and to generate an adjusted wire model. The annotation system may identify the object in another frame of the video, and may align the adjusted wire model on the object in the other frame. The annotation system may interpolate the adjusted wire model for the object for intermediate frames of the video between the frame and the other frame, and may generate three-dimensional (3D) annotations for the video based on the adjusted wire models for the frame, the intermediate frames, and the other frame. The annotation system may train a machine learning model based on the 3D annotations.

In this way, the annotation system generates three-dimensional annotations for training a machine learning model. For example, the annotation system may create high-quality annotation data (e.g., annotating three-dimensional objects in two-dimensional video data) for the machine learning models in a timely, accurate and inexpensive manner. The high-quality annotation data may be utilized to train machine learning models (e.g., neural network models) to better identify and estimate three-dimensional properties of detected objects (e.g., types, sizes, speeds, real world locations, and/or the like). Thus, the annotation system may conserve computing resources, networking resources, and/or other resources that would have otherwise been consumed, and avoid generating poor-quality annotation data, generating insufficient machine learning models based on the poor-quality annotation data, incorrect predictions generated by the insufficient machine learning models, and/or the like.

FIGS. 1A-1H are diagrams of an example 100 associated with generating three-dimensional annotations for training a machine learning model. As shown in FIGS. 1A-1H, example 100 includes an annotation system 105, an annotation data structure 110, a camera information data structure, and a video data structure. Further details of the annotation system 105, the annotation data structure 110, the camera information data structure, and the video data structure are provided elsewhere herein.

As shown in FIG. 1A, and by reference number 115, the annotation system 105 may receive camera information identifying calibration and registration information for a plurality of cameras used to generate a plurality of videos. For example, the camera information data structure may store the camera information identifying the calibration and registration information for the plurality of cameras. The calibration information for the plurality of cameras may include information identifying intrinsic camera parameters (e.g., resolution, lens distortion, and/or the like) associated with the plurality of cameras. The registration information for the plurality of cameras may include information identifying extrinsic camera parameters (e.g., camera location, camera orientation, camera height, and/or the like) associated with the plurality of cameras. The camera information may also include camera identifiers associated with the plurality of cameras, stereo-imaging associated with the plurality of cameras, light detection and ranging (LIDAR) locations associated with the plurality of cameras, and/or the like.

The annotation system 105 may periodically receive the camera information from the camera information data structure, may continuously receive the camera information from the camera information data structure, may receive the camera information based on providing a request for the camera information to the camera information data structure, and/or the like.

As further shown in FIG. 1A, and by reference number 120, the annotation system 105 may receive the plurality of videos generated by the plurality of cameras. For example, the video data structure may receive and store the plurality of videos generated by the plurality of cameras. Each of the plurality of videos may include a two-dimensional representation of a scene captured by a corresponding one of the plurality of cameras over a time period. Each of the plurality of cameras may capture one or more videos of a scene over a time period and may provide the captured videos to the video data structure for storage. For example, a camera may capture a first video of a roadway for one hour and may provide the first video to the video data structure. The camera may capture a second video of the roadway for a subsequent hour and may provide the second video to the video data structure. Thus, the camera may capture and store twenty-four videos per day in the video data structure.

The annotation system 105 may periodically receive one or more of the plurality of videos from the video data structure, may continuously receive one or more of the plurality of videos from the video data structure, may receive the one or more of the plurality of videos based on providing a request for the one or more of the plurality of videos to the video data structure, and/or the like.

As further shown in FIG. 1A, and by reference number 125, the annotation system 105 may map, in the annotation data structure, the camera information with corresponding videos based on camera identifiers associated with the plurality of cameras. For example, the camera information may include the camera identifiers associated with the plurality of cameras, and each of the plurality of videos may be associated with a camera identifier. Thus, the annotation system 105 may map the camera information with corresponding videos based on the camera identifiers associated with the plurality of cameras. The annotation system 105 may store the camera information, the plurality of videos, and the mapping of the camera information with corresponding videos in the annotation data structure 110. The annotation data structure 110 may include a database, a table, a list, and/or the like.

The camera information may enable the annotation system 105 to transform the two-dimensional representations of the plurality of videos into three dimensional representations by transforming objects in a two-dimensional image of a video into one or more three-dimensional points (e.g., an x, y, z point). The camera information may also enable the annotation system 105 to transform the three-dimensional points back to two dimensions. Thus, the annotation system 105 may annotate three-dimensional objects in the two-dimensional videos more easily and accurately than current systems. In some implementations, the annotation system 105 may utilize the camera information to obtain the third dimension to be used for all video generated by the camera. For example, the camera information may include a location of the camera capturing the video, a height of the camera from a ground plane, a distance of the camera from images captured in the video, an angle of the cameras relative to the ground plane, and/or the like. The annotation system 105 may utilize such information to obtain the third dimension to be used for all video generated by the camera.

Figure 1B:
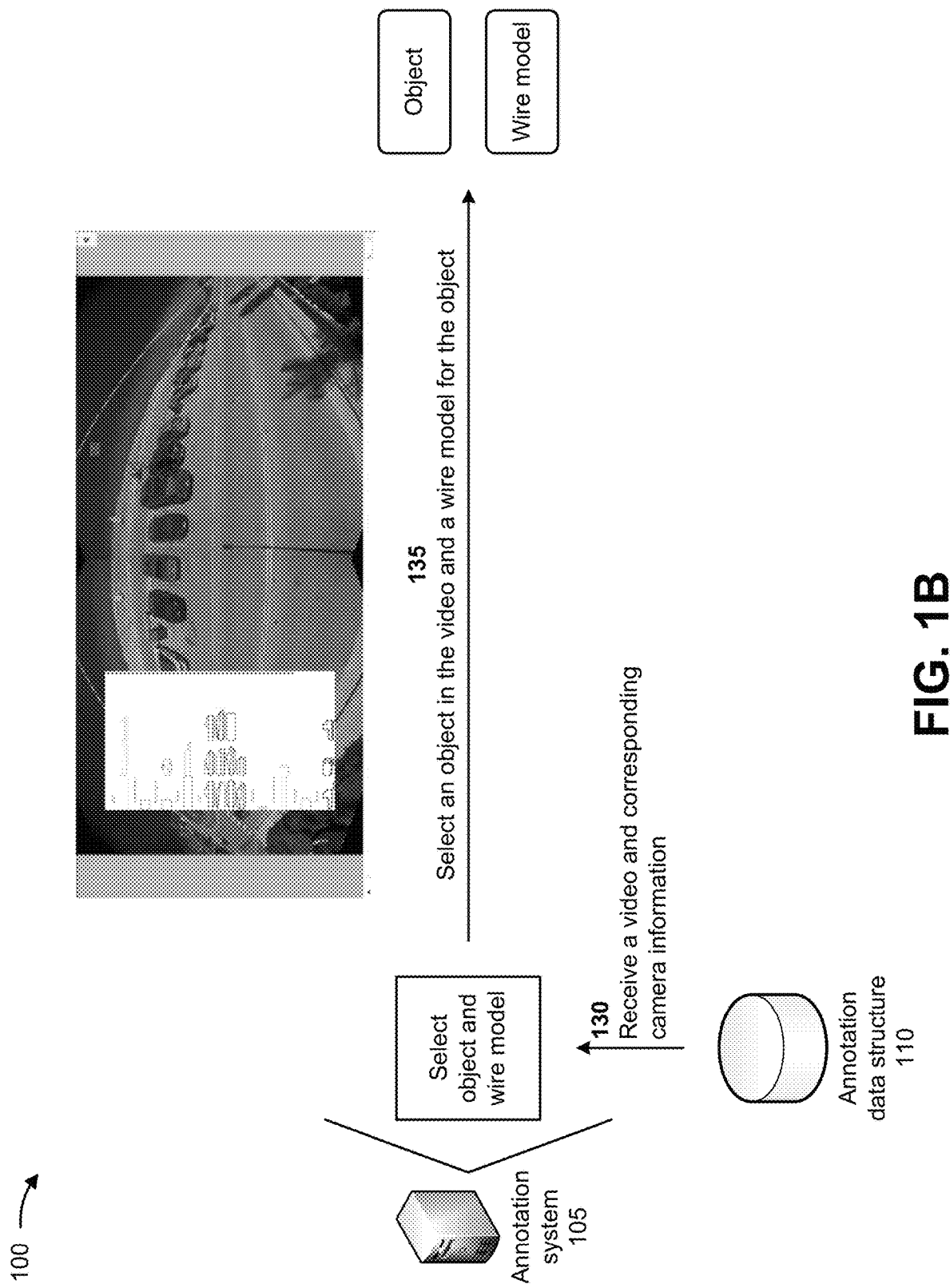

As shown in FIG. 1B, and by reference number 130, the annotation system 105 may receive a video and corresponding camera information from the annotation data structure 110. For example, the annotation system 105 may provide a request for a video to the annotation data structure 110. The request may include information identifying the video, a camera identifier of one of the plurality of cameras, and/or the like. In some implementations, the request may include a request for any of the plurality of videos stored in the annotation data structure 110. The annotation data structure 110 may retrieve the video based on the request and may retrieve the corresponding camera information based on the mapping of the camera information with corresponding videos. The annotation data structure 110 may provide the video and the corresponding camera information to the annotation system 105, and the annotation system 105 may receive the video and the corresponding camera information from the annotation data structure 110. The corresponding camera information may include the camera information associated with the camera that captured the video.

As further shown in FIG. 1B, and by reference number 135, the annotation system 105 may select an object in the video and a wire model (e.g., a three-dimensional segmentation polygon) for the object. For example, the annotation system 105 may analyze one or more frames of the video (e.g., via a computer vision model) and may identify objects in the one or more frames of the video. The annotation system 105 may select the object from the objects identified in the one or more frames of the video. The object may appear in a frame of the video that may not correspond to an ultimate first frame of the video (e.g., since the object may first appear later in the video). For example, the annotation system 105 may analyze a frame of the video and may select a vehicle on a roadway depicted in the frame as the object.

The annotation system 105 may include a predefined list of wire models for different objects that may appear in a video. The annotation system 105 may analyze the predefined list of wire models based on the selected object, and may select the wire model from the predefined list of wire models based on analyzing the predefined list. For example, if the annotation system 105 selects a vehicle as the object, the annotation system 105 may review wire models representing different types of vehicles (e.g., included in the predefined list). The annotation system 105 may select the wire model (e.g., the vehicle type) that most closely represents the selected vehicle (e.g., a sedan, a truck, a van, and/or the like). In some implementations, a user of the annotation system 105 may manually assign a wire model to an object in the frame, for example, in cases when the annotation system 105 has not detected the object or has mischaracterized the object for purposes of selecting the correct wire model.

Figure 1C:
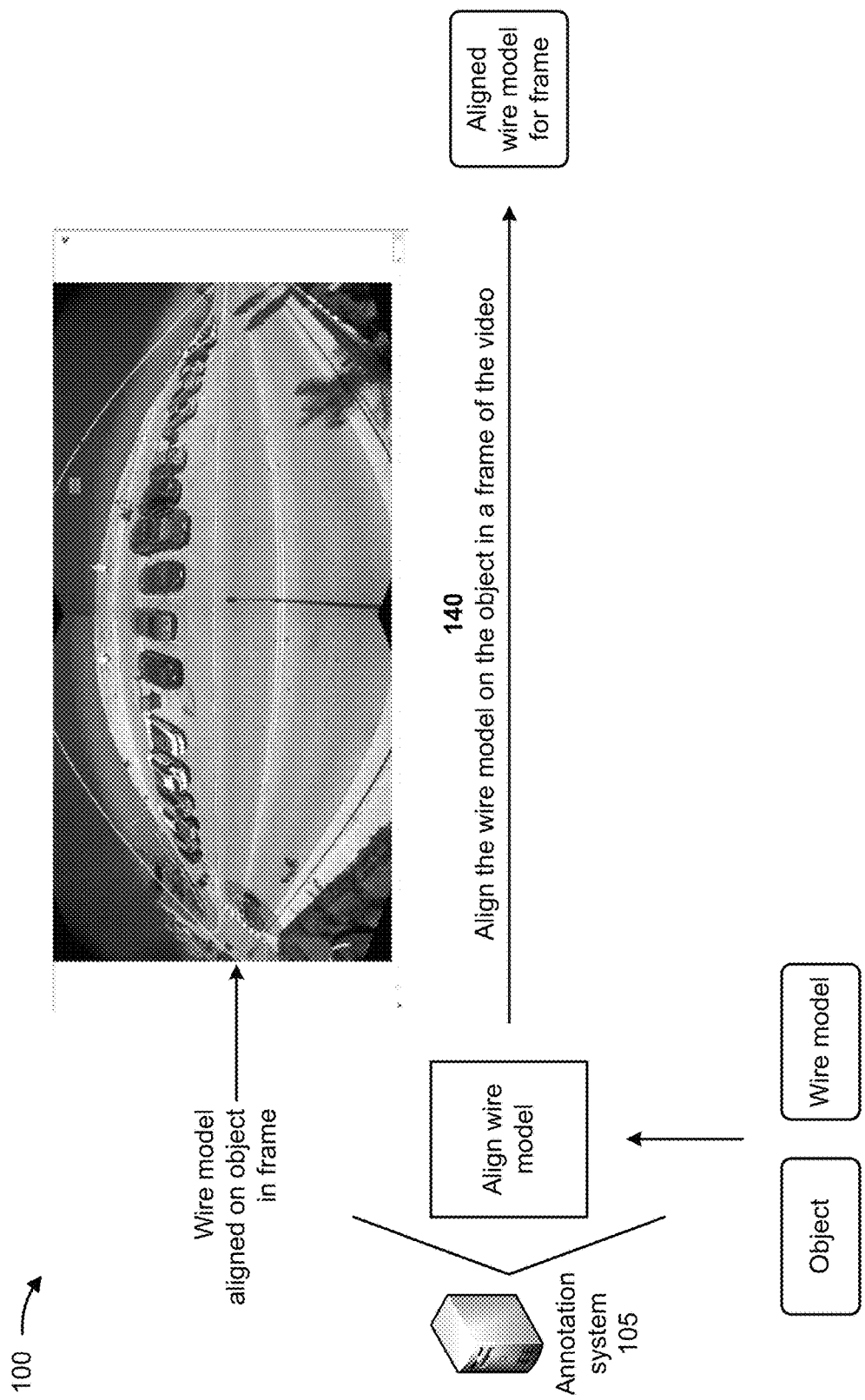

As shown in FIG. 1C, and by reference number 140, the annotation system 105 may align the wire model on the object in a frame of the video. For example, the annotation system 105 may automatically insert or overlay the wire model on the object in the frame of the video. The annotation system 105 may overlay the wire model on a location in the frame of the video where the object appears. As shown, the object (e.g., the vehicle) may be located to the left in the frame of the video, and the annotation system 105 may align the wire model (e.g., a model representing a vehicle) on the location of the object in the frame of the video. An orientation and/or a size of the wire model may not be exactly the same as an orientation and/or a size of the object in the frame. The annotation system 105 may adjust one or more of an orientation, a location, and/or a size of the wire model on the object to align the wire model on the object in the frame of the video.

Figure 1D:
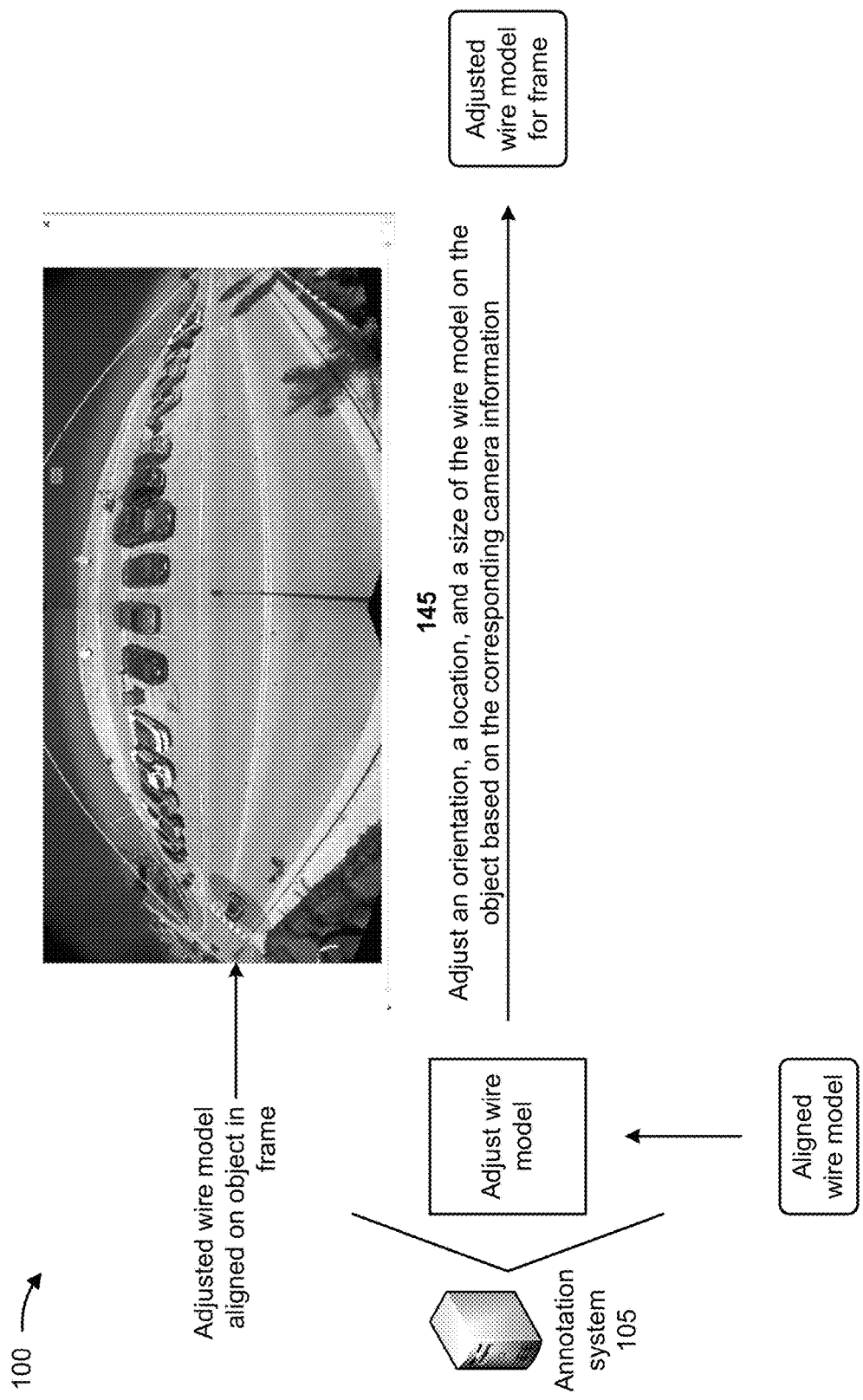

As shown in FIG. 1D, and by reference number 145, the annotation system 105 may adjust an orientation, a location, and/or a size of the wire model on the object based on the corresponding camera information. For example, since the orientation and/or the size of the wire model may not be exactly the same as the orientation and/or the size of the object in the frame, the annotation system 105 may adjust one or more of the orientation, the location, and/or the size of the model on the object based on the corresponding camera information. The corresponding camera information may include information identifying a location of the camera, an orientation of the camera, a height of the camera, a LIDAR location of the camera, and/or the like. Thus, the annotation system 105 may determine the orientation and/or the size of the object in the frame based on the corresponding camera information. The annotation system 105 may utilize the orientation and/or the size of the object in the frame to adjust the orientation, the location, and/or the size of the wire model, to generate an adjusted wire model. The annotation system 105 may overlay the adjusted wire model on the location in the frame of the video where the object appears.

Figure 1E:
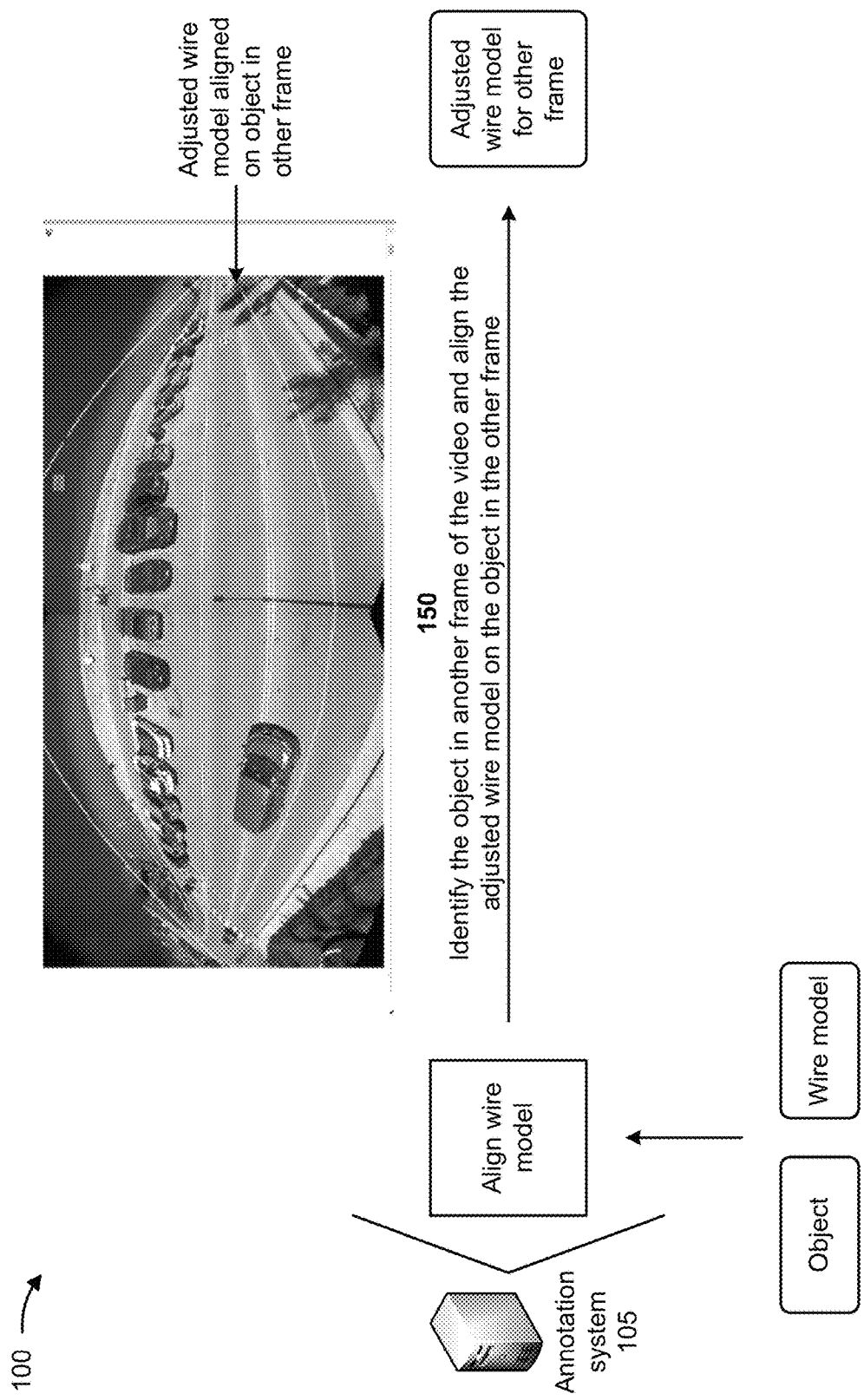

As shown in FIG. 1E, and by reference number 150, the annotation system 105 may identify the object in another frame of the video and align the adjusted wire model on the object in the frame. For example, the annotation system 105 may analyze the video to determine another frame of the video where the object appears in the video. The other frame may be a frame occurring temporally after the frame described above with respect to FIGS. 1C-1D. In that context, the frame described above may be considered a first analyzed frame of a video and the other frame may be considered a second analyzed frame of a video. In some embodiments, the other frame may not be a final frame of the video, but may include a frame of the video that occurs before the final frame (e.g., since the object may not appear in the final frame of the video being annotated). The annotation system 105 may analyze the other frame of the video (e.g., via a computer vision model), and may identify the object in the other frame based on analyzing the other frame. In some implementations, a user of the annotation system 105 may manually select the object in the other frame of the video and apply a wire model.

The annotation system 105 may automatically insert or overlay the adjusted wire model on the object in the other frame of the video. The annotation system 105 may overlay the adjusted wire model on a location in the other frame of the video where the object appears. As shown in FIG. 1E, the object (e.g., the vehicle) may be located to the right in the other frame of the video, and the annotation system 105 may align the adjusted wire model on the location of the object in the other frame of the video. In some implementations, an orientation and/or a size of the adjusted wire model may not be exactly the same as an orientation and/or a size of the object in the other frame. In such implementations, the annotation system 105 may adjust one or more of an orientation, a location, and/or a size of the adjusted wire model on the object in the other frame based on the corresponding camera information, as described above in connection with FIG. 1D.

Figure 1F:
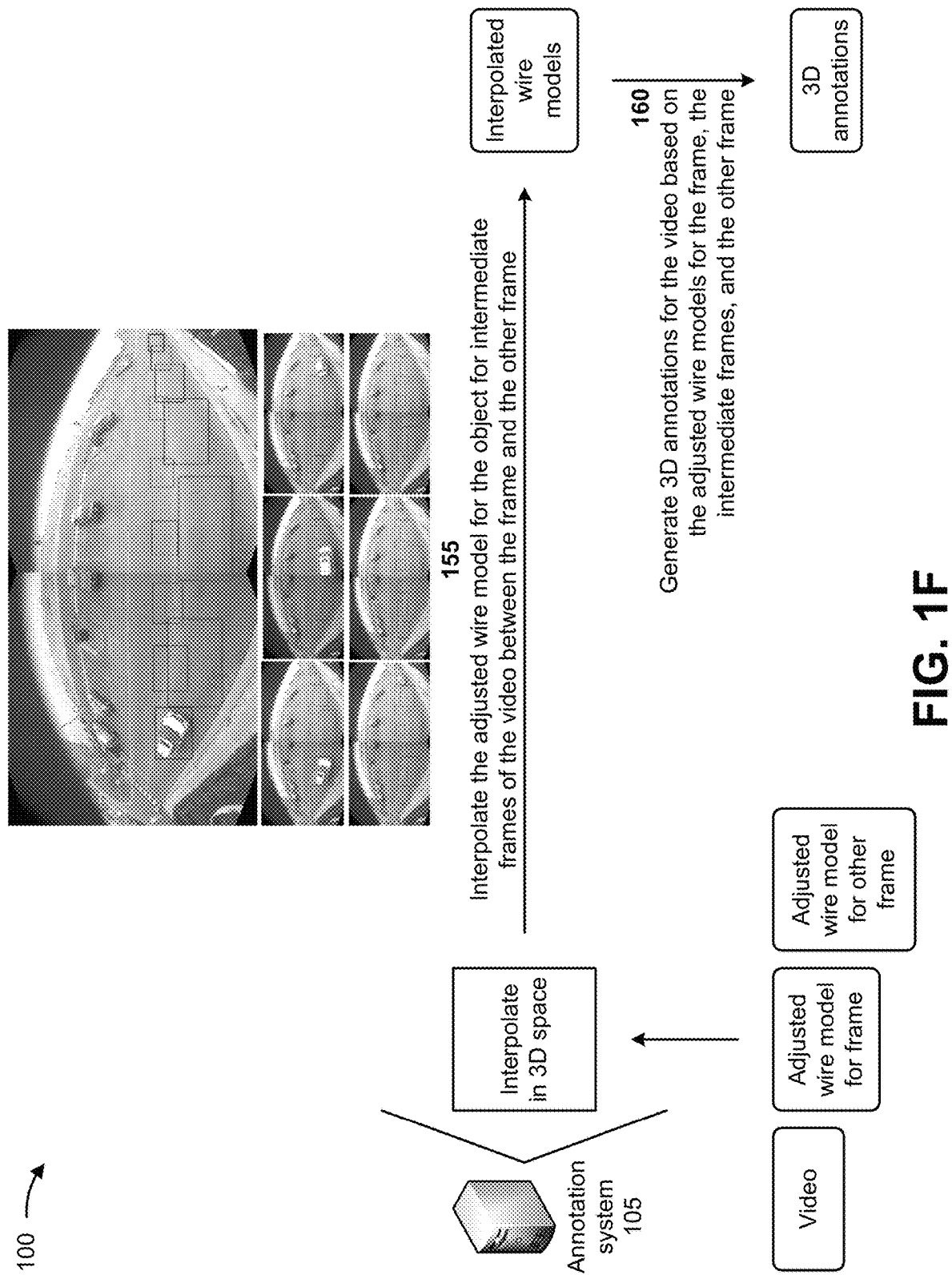

As shown in FIG. 1F, and by reference number 155, the annotation system 105 may interpolate the adjusted wire model for the object for intermediate frames of the video between the frame and the other frame. For example, the annotation system 105 may identify the intermediate frames of the video that are provided between the frame and the other frame. The annotation system 105 may determine whether the object appears in the intermediate frames of the video, and may determine whether the adjusted wire model aligns with the object in the intermediate frames (e.g., when the object appears in the intermediate frames). In some implementations, an orientation and/or a size of the adjusted wire model may not be exactly the same as an orientation and/or a size of the object in an intermediate frame. In such implementations, the annotation system 105 may adjust one or more of an orientation, a location, and/or a size of the adjusted wire model on the object in the intermediate frame based on the corresponding camera information, as described above in connection with FIG. 1D. Interpolation of the adjusted wire model for the object in the intermediate frames may thereby quickly generate three-dimensional annotations for the video without the need for a user to manually place wire models and indicate that the objects in the intermediate frames are the same object.

Interpolation of the adjusted wire model for the object in the intermediate frames is accurate because the positions and orientations of the object are calculated for the intermediate frames using three-dimensional information. For example, the annotation system 105 may linearly interpolate a track of the object (e.g., in the intermediate frames) based on three-dimensional data (e.g., x, y, and z positions) and orientation data (e.g., yaw, pitch, roll, and/or the like). FIG. 1F illustrates a benefit of the three-dimensional interpolation process. The lower and larger bounding boxes in FIG. 1F are a result of three-dimensional based interpolation for the intermediate frames of the vehicle moving in the video. The upper and smaller bounding boxes in FIG. 1F are a result of two-dimensional based interpolation for the intermediate frames of the same vehicle. As can be seen, the three-dimensional based interpolation is far more accurate than what would be generated using the two-dimensional based interpolation, as the three-dimensional based interpolation takes into account the rules of projective geometry and camera lens distortion that are applicable to working with a two-dimensional video source. When the vehicle is traveling within a velocity range (e.g., within a one kilometers per hour (kph) range, a two kph range, a three kph range, and/or the like), the annotated frame and the annotated other frame may be enough information for the annotation system 105 to determine annotations for the intermediate frames.

As further shown in FIG. 1F, and by reference number 160, the annotation system 105 may generate three-dimensional annotations for the video based on the adjusted wire models for the frame, the intermediate frames, and the other frame. For example, the annotation system 105 may utilize the type, the locations, the sizes, the orientations, and/or the like of the adjusted wire frame models, overlayed in the frame, the intermediate frames, and the other frame, as the three-dimensional annotations for the video.

In some implementations, the annotation system 105 may quickly generate reliable and accurate three-dimensional annotations for the video. The annotation system 105 may utilize the camera information to transform the two-dimensional video data into a three-dimensional object representation, where an orientation of an object in the video may be determined with a single angle (e.g., instead of three angles, as in current systems). Thus, the three-dimensional annotations are more accurate than two-dimensional based annotations because the annotation system 105 utilizes fewer parameters.

In some implementations, a user of the annotation system 105 may review the generated annotations and decide that the generated annotations are not accurate enough. For example, the interpolated annotations for an object may not be accurate due to a change in object velocity or other movement discontinuity that occurs between the first frame and the second frame. In such cases, the user may choose an intermediate frame (a "third" frame) between the first and second frames and apply a wire model annotation to the object in that frame. The annotation system 105 may then perform an interpolation of the images between the first frame and the third frame, and an interpolation of the images between the third frame and the second frame, and display the results similar to those shown in FIG. 1F.

In some implementations, the annotation system 105 may provide segmentation-like annotations by enabling three-dimensional to two-dimensional transformations that transform the three-dimensional wire models back to a two-dimensional projected space. A concave hull of a two-dimensional projected wire model of an object may include a segmentation polygon that provides a more precise approximation of object pixels to a machine learning model.

In some implementations, the annotation system 105 may perform occlusion calculations with three-dimensional position data. The annotation system 105 may utilize the three-dimensional position data to calculate distances of objects from a camera, and may utilize the distances to determine whether an object covers (e.g., occludes) another object, and an occlusion level. This occlusion level may be useful for training a machine learning model. For example, the annotation system 105 may exclude objects with low visibility (e.g., a high occlusion level) from training data for the machine learning model. The three-dimensional wire models may improve accuracies of the occlusion levels since rectangles or cuboids may include a large quantity of pixels that actually do not belong to an object.

Figure 1G:
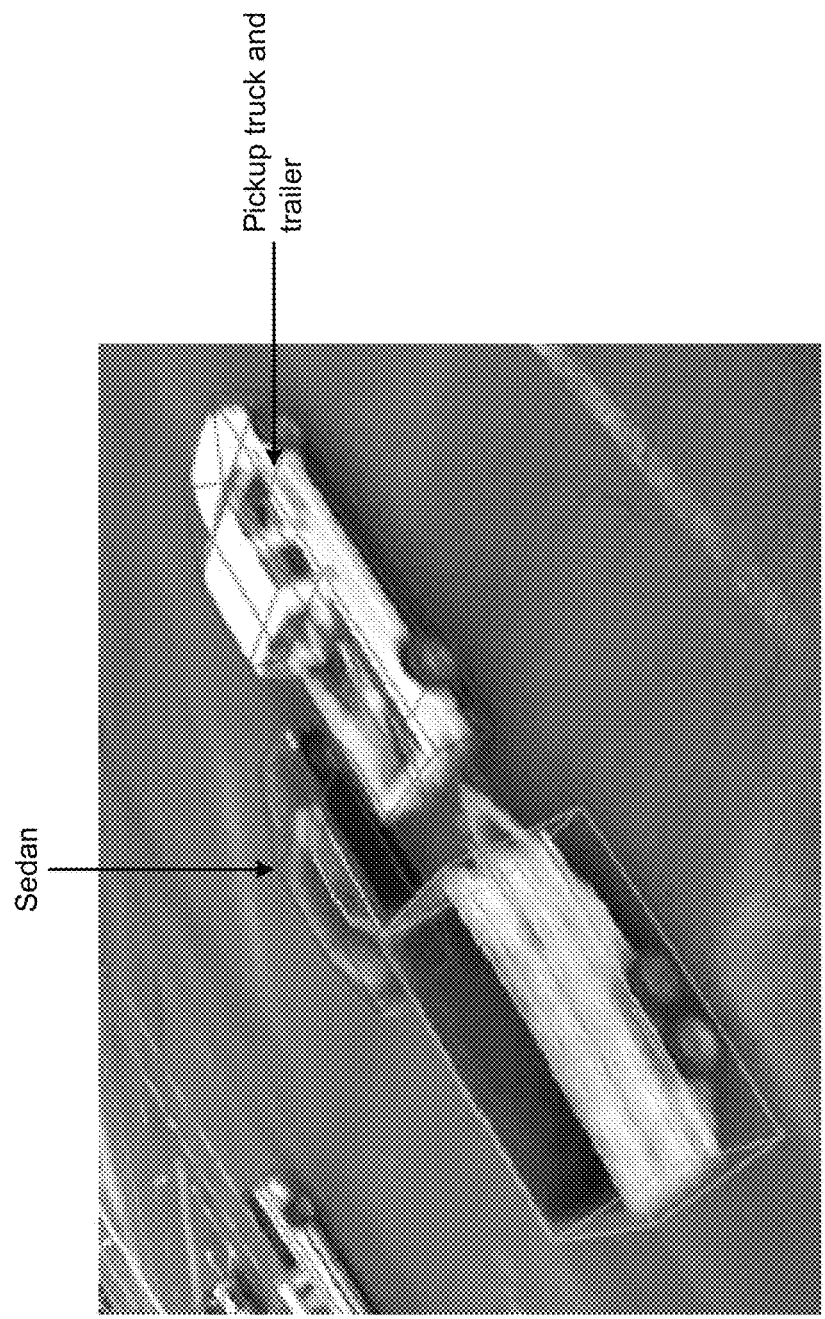

FIG. 1G provides an example image of a pickup truck and trailer that partially occludes a portion of a sedan. As shown, the annotation system 105 may utilize three-dimensional position data of the pickup truck, the trailer, and the sedan to calculate distances of the pickup truck, the trailer, and the sedan from a camera, and may utilize the distances to determine that there is occlusion between the pickup truck and trailer and the sedan, and an occlusion level, which allows more accurate placing of wire models reflective of the actual objects than would be the case if the wire models used two-dimensional images.

Figure 1H:
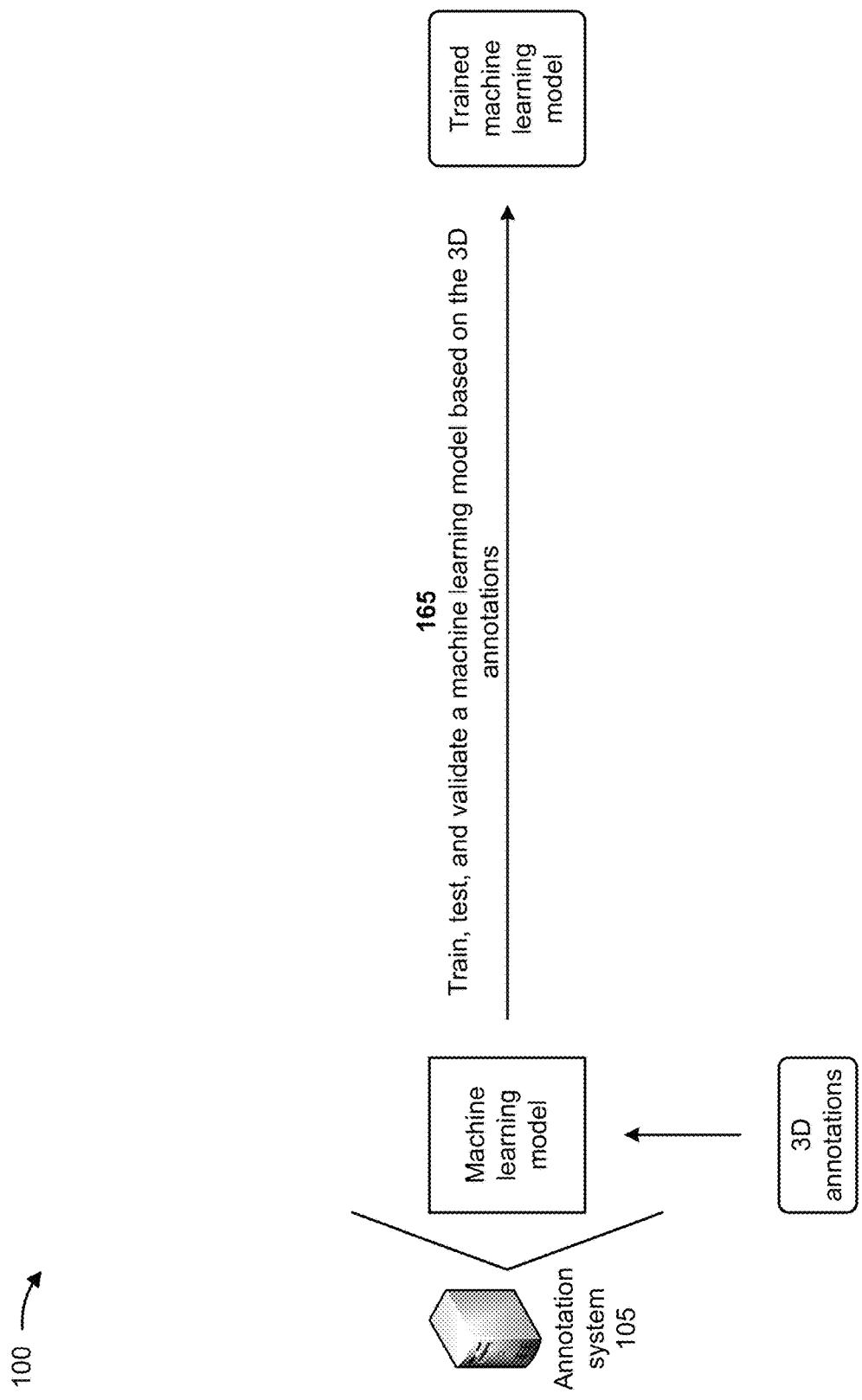

As shown in FIG. 1H, and by reference number 165, the annotation system 105 may train, test, and validate a machine learning model based on the 3D annotations. For example, the annotation system 105 may divide the 3D annotations into a first portion of 3D annotations, a second portion of 3D annotations, and a third portion of 3D annotations. The first portion, the second portion, and the third portion may include a same quantity of the 3D annotations, different quantities of the 3D annotations, and/or the like. In some implementations, more of the 3D annotations may be allotted to the first portion of 3D annotations since the first portion may be utilized to generate a training data set for the machine learning model.

The annotation system 105 may generate the training dataset for the machine learning model based on the first portion of 3D annotations. The annotation system 105 may generate a validation dataset for the machine learning model based on the second portion of 3D annotations. The annotation system 105 may generate a test dataset for the machine learning model based on the third portion of 3D annotations. In other implementations, the annotation system 105 may utilize different portions of the 3D annotations to generate the training dataset, the validation dataset, and/or the test dataset for the machine learning model.

The annotation system 105 may train the machine learning model with the training dataset to generate the trained machine learning model. The machine learning model may be trained to detect one or more of sizes, speeds, or geographical locations of objects in videos processed by the machine learning model. The machine learning model may be utilized in a service that includes a computer vision service. Examples of such services include a mobility service (e.g., planning and paying for a transportation service), a vision zero service (e.g., a road safety service), or a social distancing service (e.g., crowd control or foot traffic planning), and/or the like. In some implementations, rather than training the machine learning model, the annotation system 105 may obtain the machine learning model from another system or device that trained the machine learning model. In this case, the annotation system 105 may provide the other system or device with the training dataset, the validation dataset, and/or the test dataset for use in training the machine learning model, and may provide the other system or device with updated training, validation, and/or test datasets to retrain the machine learning model in order to update the machine learning model.

In some implementations, the machine learning model may include a neural network model, such as a convolutional neural network (CNN) model. A neural network model may include a collection of connected units or nodes. Each connection (e.g., edge) can transmit a signal to other nodes. A node receives and processes a signal and may signal nodes connected to the node. A signal at a connection is a real number, and an output of each node is computed by a non-linear function of the sum of inputs. The nodes and the connections may include weights that adjust as learning proceeds. The weights increase or decrease a strength of a signal at a connection. Typically, the nodes may be aggregated into layers. Different layers may perform different transformations on inputs. Signals may travel from a first layer (an input layer), to a last layer (an output layer), possibly after traversing the layers multiple times.

In some implementations, the annotation system 105 may train the machine learning model with the training dataset to generate the trained machine learning model, and may process the validation dataset, with the trained machine learning model, to validate that the trained machine learning model is operating correctly. If the trained machine learning model is operating correctly, the annotation system 105 may process the trained machine learning model, with the test dataset, to further ensure that the trained machine learning model is operating correctly. If the trained machine learning model is operating incorrectly, the annotation system 105 may modify the trained machine learning model and may revalidate and/or retest the modified machine learning model based on the validation dataset and/or the test dataset.

In this way, the annotation system 105 generates three-dimensional annotations for training a machine learning model. For example, the annotation system 105 may create high-quality annotation data for the machine learning models in a timely, accurate and inexpensive manner. The high-quality annotation data may be utilized to train machine learning models (e.g., neural network models) to better identify and estimate three-dimensional properties of detected objects (e.g., sizes, speeds, real world locations, and/or the like) in a computer vision system, such as may be used as part of mobility, vision zero, crowd management, and similar use cases. Thus, the annotation system 105 may conserve computing resources, networking resources, and/or other resources that would have otherwise been consumed by generating poor-quality annotation data, generating insufficient machine learning models based on the poor-quality annotation data, utilizing incorrect predictions generated by the insufficient machine learning models, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
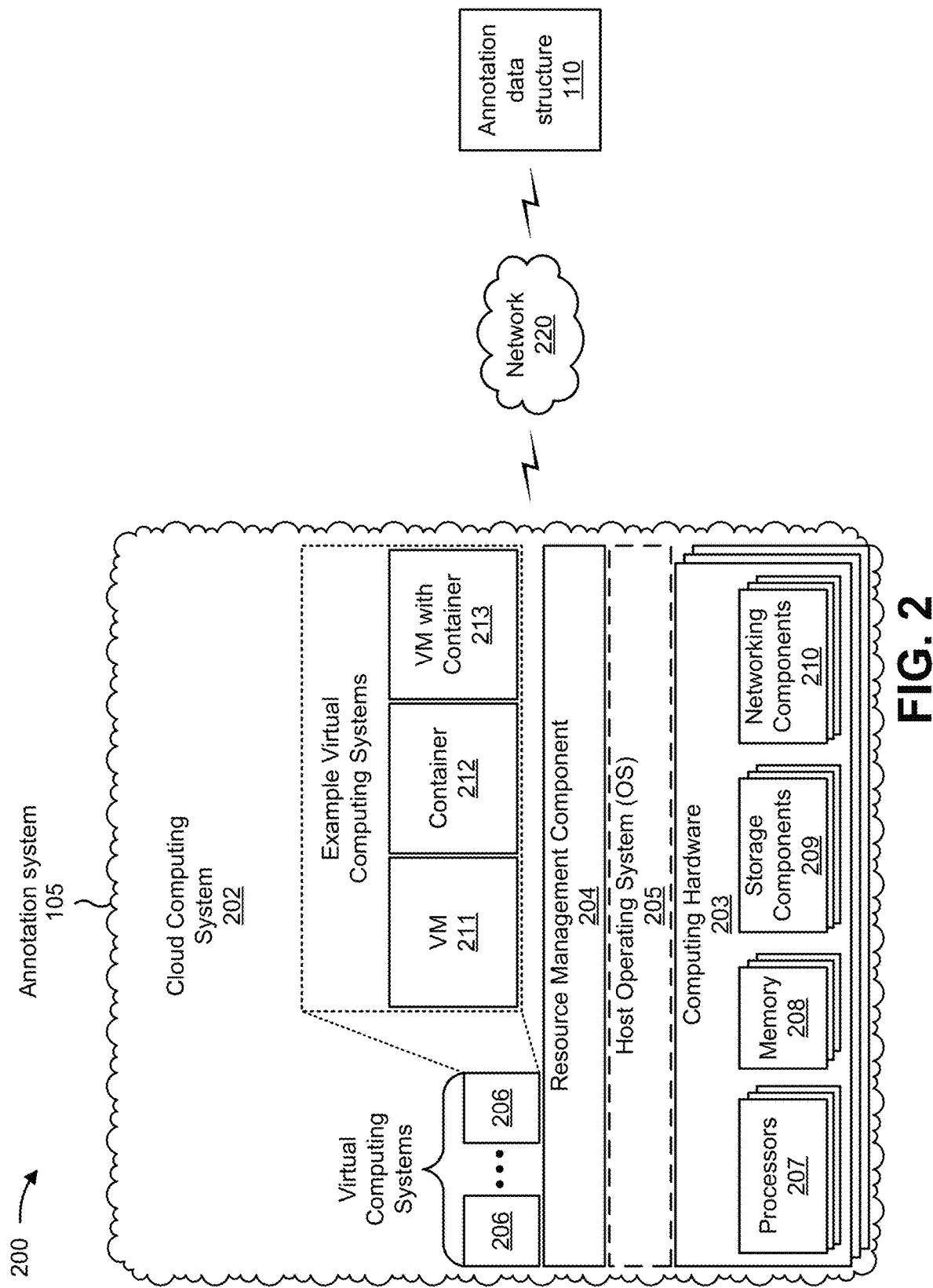
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the annotation system 105, which may include one or more elements of and/or may execute within a cloud computing system 202. The cloud computing system 202 may include one or more elements 203-213, as described in more detail below. As further shown in FIG. 2, environment 200 may include the data structure 110 and/or a network 220. Devices and/or elements of environment 200 may interconnect via wired connections and/or wireless connections.

The data structure 110 includes one or more devices capable of receiving, generating, storing, processing, and/or providing information, as described elsewhere herein. The data structure 110 may include a communication device and/or a computing device. For example, the data structure 110 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 110 may communicate with one or more other devices of the environment 200, as described elsewhere herein.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the annotation system 105 may include one or more elements 203-213 of the cloud computing system 202, may execute within the cloud computing system 202, and/or may be hosted within the cloud computing system 202, in some implementations, the annotation system 105 may not be cloud-based (e.g., may be implemented outside of a cloud computing system) or may be partially cloud-based. For example, the annotation system 105 may include one or more devices that are not part of the cloud computing system 202, such as the device 300 of FIG. 3, which may include a standalone server or another type of computing device. The annotation system 105 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
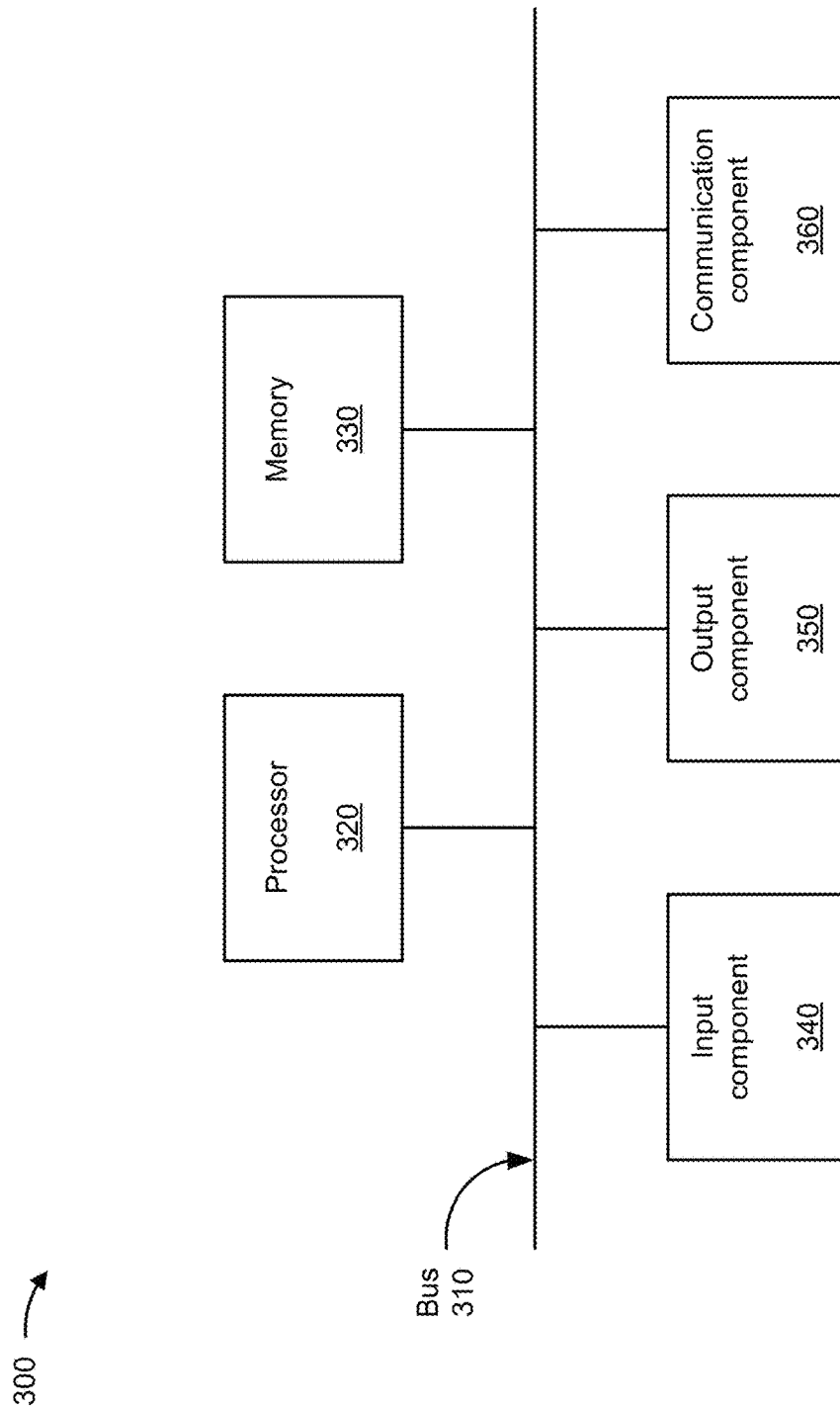
FIG. 3 is a diagram of example components of one or more devices of FIG. 3.

FIG. 3 is a diagram of example components of a device 300, which may correspond to the annotation system 105 and/or the annotation data structure 110. In some implementations, the annotation system 105 and/or the annotation data structure 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
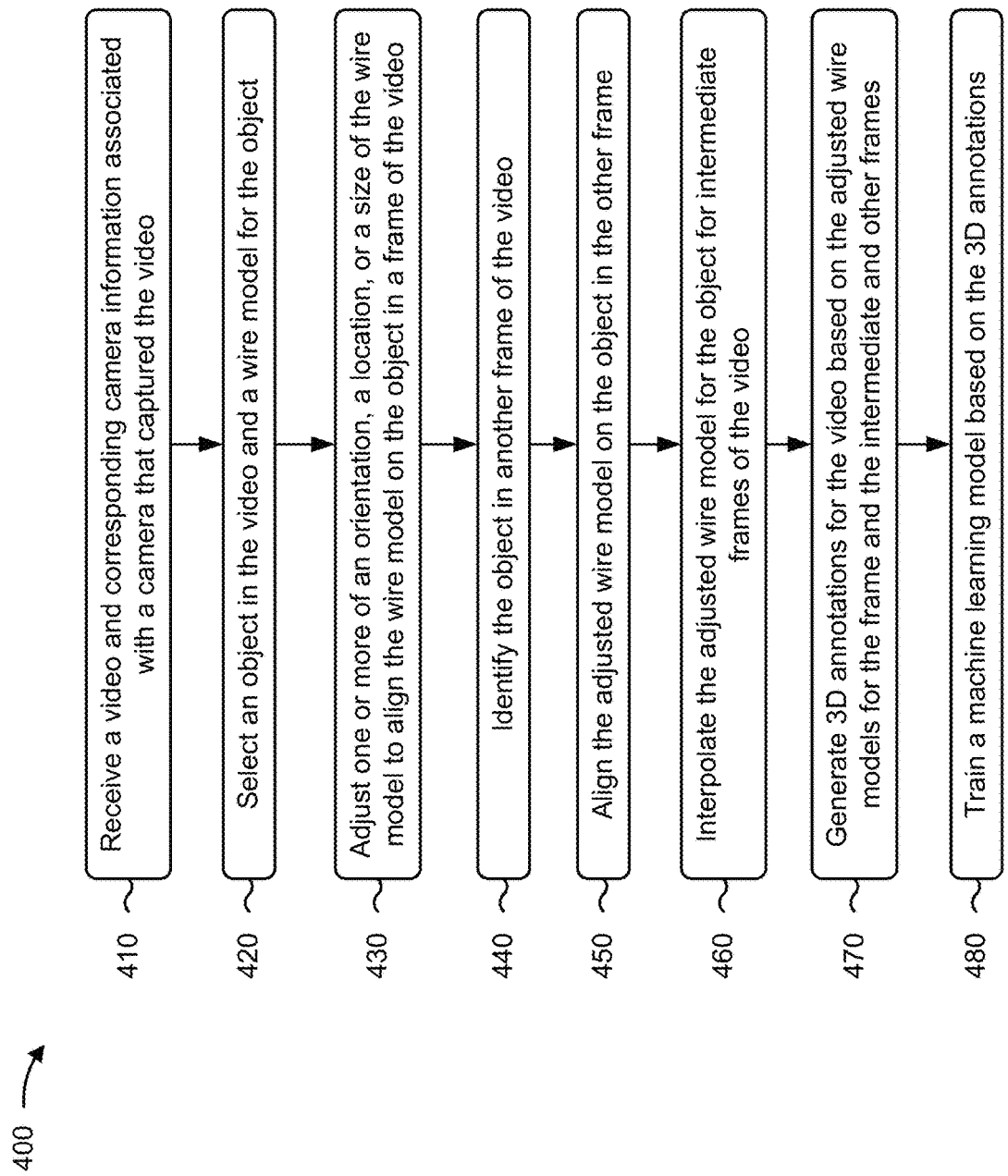
FIG. 4 is a flowchart of an example process for generating three-dimensional annotations for training a machine learning model.

FIG. 4 is a flowchart of an example process 400 for generating three-dimensional annotations for training a machine learning model. In some implementations, one or more process blocks of FIG. 4 may be performed by a device (e.g., the annotation system 105). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a video and corresponding camera information associated with a camera that captured the video (block 410). For example, the device may receive a video and corresponding camera information associated with a camera that captured the video, as described above. In some implementations, the corresponding camera information includes information identifying one or more of lens distortion parameters associated with the camera, a geographical location of the camera, or a position of the camera. In some implementations, the video is a two-dimensional representation of a three-dimensional scene. In some implementations, the corresponding camera information includes information identifying one or more of stereo imaging associated with the camera, light detection and ranging location associated with the camera, or parameters associated with the camera.

As further shown in FIG. 4, process 400 may include selecting an object in the video and a wire model for the object (block 420). For example, the device may select an object in the video and a wire model for the object, as described above.

As further shown in FIG. 4, process 400 may include adjusting one or more of an orientation, a location, or a size of the wire model to align the wire model on the object in a frame of the video (block 430). For example, the device may adjust one or more of an orientation, a location, or a size of the wire model to align the wire model on the object in a frame of the video, based on the corresponding camera information and to generate an adjusted wire model, as described above.

As further shown in FIG. 4, process 400 may include identifying the object in another frame of the video (block 440). For example, the device may identify the object in another frame of the video, as described above.

As further shown in FIG. 4, process 400 may include aligning the adjusted wire model on the object in the other frame (block 450). For example, the device may align the adjusted wire model on the object in the other frame, as described above.

As further shown in FIG. 4, process 400 may include interpolating the adjusted wire model for the object for intermediate frames of the video (block 460). For example, the device may interpolate the adjusted wire model for the object for intermediate frames of the video between the frame and the other frame, as described above. In some implementations, interpolating the adjusted wire model for the object for the intermediate frames includes linearly interpolating the adjusted wire model for the object for the intermediate frames based on three-dimensional position data of the object and three-dimensional orientation of the object.

As further shown in FIG. 4, process 400 may include generating 3D annotations for the video based on the adjusted wire models for the frame, the intermediate frame, and the other frame (block 470). For example, the device may generate 3D annotations for the video based on the adjusted wire models for the frame, the intermediate frames, and the other frame, as described above. In some implementations, the wire model is a three-dimensional segmentation polygon and the three-dimensional annotations are three-dimensional segmentation-based annotations.

As further shown in FIG. 4, process 400 may include training a machine learning model based on the 3D annotations (block 480). For example, the device may train a machine learning model based on the 3D annotations, as described above. In some implementations, the machine learning model is a neural network model.

In some implementations, process 400 includes receiving camera information identifying calibration and registration information for a plurality of cameras used to generate a plurality of videos; receiving the plurality of videos generated by the plurality of cameras; and mapping, in an annotation data structure, the camera information with corresponding videos based on camera identifiers associated with the plurality of cameras, where the video and the corresponding camera information are received from the annotation data structure.

In some implementations, process 400 includes testing the machine learning model based on the three-dimensional annotations. In some implementations, process 400 includes validating the machine learning model based on the three-dimensional annotations. In some implementations, process 400 includes calculating an occlusion level of the object with another object in the video based on the three-dimensional annotations, and training the machine learning model based on the occlusion level.

In some implementations, process 400 includes causing the machine learning model to be utilized to detect one or more of sizes, speeds, or geographical locations of objects in videos processed by the machine learning model. In some implementations, process 400 includes causing the machine learning model to be utilized in a computer vision service, such as used in one or more of a mobility service, a vision zero service, or a crowd management service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a video and corresponding camera information associated with a camera that captured the video;
   selecting, by the device, an object in the video and a wire model for the object;
   adjusting, by the device, one or more of an orientation, a location, or a size of the wire model to align the wire model on the object in a frame of the video, based on the corresponding camera information and to generate an adjusted wire model;
   identifying, by the device, the object in another frame of the video;
   aligning, by the device, the adjusted wire model on the object in the other frame;
   interpolating, by the device, the adjusted wire model for the object for intermediate frames of the video between the frame and the other frame, wherein the interpolation is based on three-dimensional position data of the object, three-dimensional orientation data of the object, and lens distortion of the camera;
   generating, by the device, three-dimensional annotations for the video based on the adjusted wire models for the frame, the intermediate frames, and the other frame; and
   training, by the device, a machine learning model based on the three-dimensional annotations.

2. The method of claim 1, further comprising:
   receiving camera information identifying calibration and registration information for a plurality of cameras used to generate a plurality of videos;
   receiving the plurality of videos generated by the plurality of cameras; and
   mapping, in an annotation data structure, the camera information with corresponding videos based on camera identifiers associated with the plurality of cameras, wherein the video and the corresponding camera information are received from the annotation data structure.

3. The method of claim 1, further comprising:
   testing the machine learning model based on the three-dimensional annotations.

4. The method of claim 1, further comprising:
   validating the machine learning model based on the three-dimensional annotations.

5. The method of claim 1, wherein the corresponding camera information includes information identifying one or more of:
   lens distortion parameters associated with the camera,
   a geographical location of the camera, or
   a position of the camera.

6. The method of claim 1, wherein the wire model is a three-dimensional segmentation polygon and the three-dimensional annotations are three-dimensional segmentation-based annotations.

7. The method of claim 1, further comprising:
   calculating an occlusion level of the object with another object in the video based on the three-dimensional annotations; and
   training the machine learning model based on the occlusion level.

8. The method of claim 1, further comprising:
   causing the machine learning model to be utilized to detect one or more of sizes, speeds, or geographical locations of objects in videos processed by the machine learning model.

9. A device, comprising:
   one or more processors configured to:
      receive, from a data structure that includes a plurality of videos mapped to camera information, a video and corresponding camera information associated with a camera that captured the video;
      select an object in the video and a wire model for the object;
      adjust one or more of an orientation, a location, or a size of the wire model to align the wire model on the object in a frame of the video, based on the corresponding camera information and to generate an adjusted wire model;
      identify the object in another frame of the video;
      align the adjusted wire model on the object in the other frame;
      interpolate the adjusted wire model for the object for intermediate frames of the video between the frame and the other frame, wherein the interpolation is based on three-dimensional position data of the object, three-dimensional orientation data of the object, and lens distortion of the camera;
      generate three-dimensional annotations for the video based on the adjusted wire models for the frame, the intermediate frames, and the other frame; and
      train a machine learning model based on the three-dimensional annotations.

10. The device of claim 9, wherein the one or more processors are further configured to:
    calculate an occlusion level of the object with another object in the video based on the three-dimensional annotations; and
    train the machine learning model based on the occlusion level.

11. The device of claim 9, wherein the one or more processors are further configured to:
    cause the machine learning model to be utilized to detect one or more of sizes, speeds, or geographical locations of objects in videos processed by the machine learning model.

12. The device of claim 9, wherein the one or more processors are further configured to:
    cause the machine learning model to be utilized in one or more of a mobility service, a vision zero service, or a social distancing service.

13. The device of claim 9, wherein the video is a two-dimensional representation of a three-dimensional scene.

14. The device of claim 9, wherein the corresponding camera information includes information identifying one or more of:
    stereo imaging associated with the camera,
    light detection and ranging location associated with the camera, or
    parameters associated with the camera.

15. The device of claim 9, wherein the machine learning model is a neural network model.

16. A non-transitory computer-readable medium storing a set of instructions, the set of instructions comprising:
  one or more instructions that, when executed by one or more processors of a device, cause the device to:
    receive a video and corresponding camera information associated with a camera that captured the video;
    select an object in the video and a wire model for the object;
    adjust one or more of an orientation, a location, or a size of the wire model to align the wire model on the object in a frame of the video, based on the corresponding camera information and to generate an adjusted wire model;
    identify the object in another frame of the video;
    align the adjusted wire model on the object in the other frame;
    interpolate the adjusted wire model for the object for intermediate frames of the video between the frame and the other frame, wherein the interpolation is based on three-dimensional position data of the object, three-dimensional orientation data of the object, and lens distortion of the camera;
    generate three-dimensional annotations for the video based on the adjusted wire models for the frame, the intermediate frames, and the other frame;
    train a machine learning model based on the three-dimensional annotations; and
    cause the machine learning model to be implemented.

17. The non-transitory computer-readable medium of claim 16, wherein the one or more instructions further cause the device to:
  receive camera information identifying calibration and registration information for a plurality of cameras used to generate a plurality of videos;
  receive the plurality of videos generated by the plurality of cameras; and
  map, in an annotation data structure, the camera information with corresponding videos based on camera identifiers associated with the plurality of cameras,
    wherein the video and the corresponding camera information are received from the annotation data structure.

18. The non-transitory computer-readable medium of claim 16, wherein the one or more instructions further cause the device to:
  test the machine learning model based on the three-dimensional annotations; and
  validate the machine learning model based on the three-dimensional annotations.

19. The non-transitory computer-readable medium of claim 16, wherein the one or more instructions further cause the device to:
  calculate an occlusion level of the object with another object in the video based on the three-dimensional annotations; and
  train the machine learning model based on the occlusion level.

20. The non-transitory computer-readable medium of claim 16, wherein the machine learning model is configured to be utilized to detect one or more of sizes, speeds, or geographical locations of objects in videos processed by the machine learning model.

* * * * *